United States Patent
Xia et al.

(10) Patent No.: US 9,629,079 B2
(45) Date of Patent: *Apr. 18, 2017

(54) METHOD, APPARATUS, AND SYSTEM FOR ENERGY SAVING MANAGEMENT IN NETWORK MANAGEMENT SYSTEM

(71) Applicant: Huawei Technologies Co., Ltd., Shenzhen (CN)

(72) Inventors: Haitao Xia, Beijing (CN); Dong Zhao, Shanghai (CN); Lan Zou, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 14/946,588

(22) Filed: Nov. 19, 2015

(65) Prior Publication Data

US 2016/0081016 A1   Mar. 17, 2016

Related U.S. Application Data

(63) Continuation of application No. 13/664,224, filed on Oct. 30, 2012, now Pat. No. 9,220,060, which is a
(Continued)

(30) Foreign Application Priority Data

Apr. 30, 2010 (CN) .......................... 2010 1 0169426

(51) Int. Cl.
*H04W 52/02* (2009.01)
*H04W 4/02* (2009.01)
*H04W 88/10* (2009.01)

(52) U.S. Cl.
CPC ....... *H04W 52/0206* (2013.01); *H04W 4/025* (2013.01); *H04W 88/10* (2013.01); *Y02B 60/50* (2013.01)

(58) Field of Classification Search
None
See application file for complete search history.

(56) References Cited

U.S. PATENT DOCUMENTS 6,360,106 B1    3/2002  Besson
8,554,224 B2 *  10/2013 Soliman .............. H04W 36/165
                                                455/436
(Continued)

FOREIGN PATENT DOCUMENTS

CN    1240095 A    12/1999
CN    1731879 A    2/2006
(Continued)

OTHER PUBLICATIONS

3GPP TR 32.826 V2.0.0 (Mar. 2010) "Study on Energy Savings Management (ESM)", pp. 1-33.*
(Continued)

*Primary Examiner* — Robert C Scheibel
(74) *Attorney, Agent, or Firm* — Slater Matsil, LLP

(57) ABSTRACT

A method, an apparatus, and a system for energy saving management in a network management system are disclosed. The method for energy saving management includes: configuring, by an integrated reference point manager IRPManager, an energy saving policy, where the energy saving policy includes an identifier of a coverage backup entity for energy saving and further includes policy information of energy saving activation and/or policy information of energy saving deactivation; and sending, by the IRPManager, the energy saving policy to an integrated reference point agent IRPAgent, where the energy saving policy is used to perform energy saving management on a base station.

20 Claims, 3 Drawing Sheets

Related U.S. Application Data continuation of application No. PCT/CN2011/073497, filed on Apr. 29, 2011.

(56) References Cited

U.S. PATENT DOCUMENTS

| | | | |
|---|---|---|---|
| 2009/0097426 A1 | 4/2009 | Yin | |
| 2011/0171930 A1* | 7/2011 | Yoon | H04W 52/0216 455/405 |
| 2016/0081016 A1 | 3/2016 | Xia et al. | |

FOREIGN PATENT DOCUMENTS

| | | |
|---|---|---|
| CN | 101080047 A | 11/2007 |
| CN | 101179814 A | 5/2008 |
| CN | 101369839 A | 2/2009 |
| CN | 101400125 A | 4/2009 |
| CN | 102238586 B | 2/2014 |
| EP | 1814255 A1 | 8/2007 |
| EP | 2117279 A1 | 11/2009 |
| JP | H07170566 A | 7/1995 |
| JP | 10145842 A | 5/1998 |
| JP | 2009124461 A | 6/2009 |
| WO | 2009031955 A1 | 3/2009 |
| WO | 2010035577 A1 | 4/2010 |

OTHER PUBLICATIONS

"3rd Generation Partnership Project; Technical Specification Group Services and System Aspects; Telecommunication Management; Study on Energy Savings Management (ESM) (Release 10)," 3GPP TR 32.826 V10.0.0, Mar. 2010, pp. 1-33.

3rd Generation Partnership Project; Technical Specification Group Services and System Aspects; Telecommunication management; Study on Energy Savings Management (ESM) (Release 9), 3GPP TR 32.826 V2.0.0, Mar. 2010, 33 pages.

"3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 9)," 3GPP TS 32.522, V9.0.0, Mar. 2010, 22 pages.

"3rd Generation Partnership Project; Technical Specification Group Services and System Aspects; Telecommunications Management Evolved Universal Terrestrial Radio Access Network (E-UTRAN) Network Resource Model (NRM) Integration Reference Point (IRP): Information Service (IS) (Release 9)," 3GPP TS 32.762, V9.3.1, Apr. 2010, 24 pages.

"3rd Generation Partnership Project; Technical Specification Group Radio Access Network; Evolved Universal Terrestrial Radio Access (E-UTRA); Layer 2—Measurements (Release 9)," 3FPP TS 36.314, V9.0.0, Dec. 2009, 15 pages.

Notice of Reason for Rejection received Janpanese Application No. 2013-506479 mailed Feb. 12, 2014, 6 pages.

Alcatel-Lucent, "Add energy saving requirements," 3GPP TSG-SA5 (Telecom Management), S5-101017, Meeting SA5#70, Mar. 1-5, 2010, Xiamen, China, 4 pages.

* cited by examiner

The IRPManager sends an energy saving activation command to the IRPAgent, requiring the IRPAgent to initiate an energy saving activation process on one or more energy saving entities (base stations or cells), where the energy saving activation command includes one or more pieces of the following information: operation type of energy saving, delay of energy saving activation, delay of energy saving deactivation in case of OAM link break, and retry count of OAM connection reestablishment before energy saving deactivation in case of OAM link break — 301

The IRPManager receives an energy saving activation result sent by the IRPAgent — 302

FIG. 3

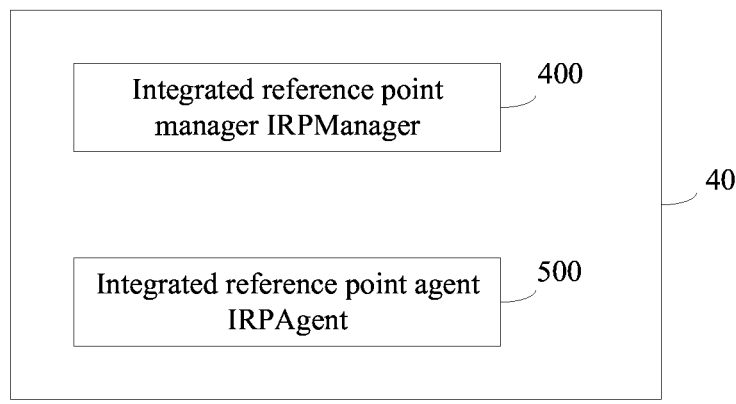

FIG. 4

METHOD, APPARATUS, AND SYSTEM FOR ENERGY SAVING MANAGEMENT IN NETWORK MANAGEMENT SYSTEM

This application is a continuation of U.S. patent application Ser. No. 13/664,224, filed on Oct. 30, 2012, which is a continuation of International Application No. PCT/CN2011/073497, filed on Apr. 29, 2011, which claims priority to Chinese Patent Application No. 201010169426.1, filed on Apr. 30, 2010. The afore-mentioned patent applications are hereby incorporated by reference in their entireties.

TECHNICAL FIELD

The present invention relates to the field of mobile communications, and in particular embodiments to an energy saving management technology in a network management system.

BACKGROUND

Nowadays, conventional resources are increasingly in short supply and energy prices are continuously rising, so that operators have to decrease their operating expenditure by energy saving and emission reduction of communication devices. The existing energy saving method for a base station is mainly to use the following operation mode: A base station triggers cell turn-off according to its energy saving algorithm, and a neighboring base station triggers cell turn-on through an X2 interface. An energy saving status change notification is transmitted on the X2 interface.

However, the conventional energy saving operation mode lacks driving by a unified energy saving policy. Therefore, the energy saving algorithm inside the base station may become an isolated island of operation execution, necessary execution environments (or contexts) and algorithm input are lack, and energy saving management requirements in different network deployment scenarios may not be satisfied.

SUMMARY

In one aspect, the present invention provides a method for energy saving management in a network management system, including: configuring, by an integrated reference point manager IRPManager, an energy saving policy, where the energy saving policy includes an identifier of a coverage backup entity for energy saving and further includes policy information of energy saving activation and/or policy information of energy saving deactivation; and sending, by the IRPManager, the energy saving policy to an integrated reference point agent IRPAgent, where the energy saving policy is used to perform energy saving management on a base station.

In another aspect, the present invention provides a method for energy saving management in a network management system, including: in centralized energy saving management, sending, by an integrated reference point manager IRPManager, an energy saving activation command to an integrated reference point agent IRPAgent, requiring the IRPAgent to initiate an energy saving activation process on one or more energy saving entities, where the energy saving activation command includes an identifier of an energy saving entity and further includes one or more pieces of the following information: energy saving operation type, delay of energy saving activation, delay of energy saving deactivation in case of Operation Administration and Maintenance link break, and retry count of OAM connection reestablishment before energy saving deactivation in case of OAM link break; and receiving, by the IRPManager, an energy saving activation result sent by the IRPAgent.

In still another aspect, the present invention provides an integrated reference point manager IRPManager, where the IRPManager includes a configuring unit and a sending unit. The sending unit configures an energy saving policy, where the energy saving policy includes an identifier of a coverage backup entity for energy saving and further includes policy information of energy saving activation and/or policy information of energy saving deactivation; and the sending unit sends the energy saving policy to an integrated reference point agent IRPAgent, where the energy saving policy is used to perform energy saving management on a base station. Accordingly, in still another aspect, the present invention also provides a system for energy saving management, including: the above integrated reference point manager IRPManager and an integrated reference point agent IRPAgent.

In still another aspect, the present invention provides an integrated reference point manager IRPManager, where the IRPManager includes a sending unit and a receiving unit. In centralized energy saving management, the sending unit sends an energy saving activation command to an integrated reference point agent IRPAgent, requiring the IRPAgent to initiate an energy saving activation process on one or more energy saving entities, where the energy saving activation command includes an identifier of an energy saving entity and further includes one or more pieces of the following information: energy saving operation type, delay of energy saving activation, delay of energy saving deactivation in case of OAM link break, and retry count of OAM connection reestablishment before energy saving deactivation in case of OAM link break; and the receiving unit receives an energy saving activation result sent by the IRPAgent. Accordingly, in still another aspect, the present invention also provides a system for energy saving management, including: the above integrated reference point manager IRPManager and an integrated reference point agent IRPAgent.

In the above technical solutions, the IRPManager provides information needed for energy saving management performed on the base station to the IRPAgent, so as to satisfy energy saving management requirements in different network deployment scenarios.

BRIEF DESCRIPTION OF THE DRAWINGS

FIG. 3 is a schematic diagram of a method for energy saving management according to another embodiment of the present invention;

FIG. 4 is a schematic structural diagram of a system for energy saving management according to an embodiment of the present invention;

DETAILED DESCRIPTION OF ILLUSTRATIVE EMBODIMENTS

Embodiments of the present invention are described below with reference to accompanying drawings.

Figure 1:
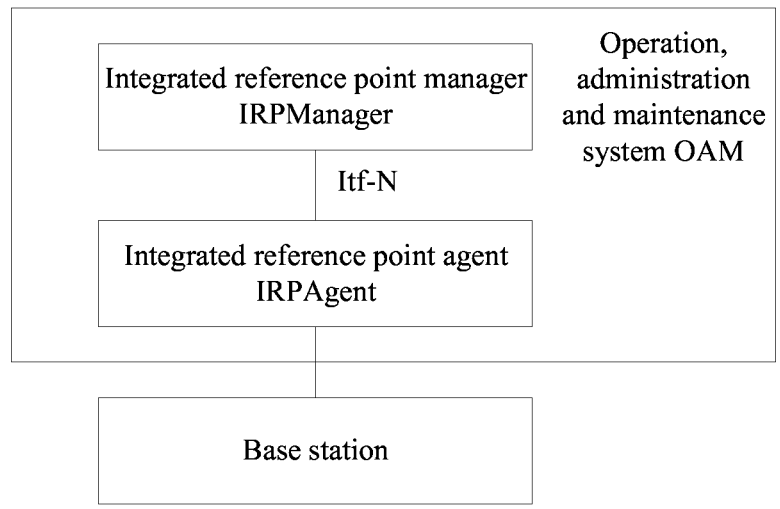
FIG. 1 is a schematic structural diagram of a system according to an embodiment of the present invention.

The following first describes the related content of an operation, administration and maintenance (OAM) system. As shown in FIG. 1, in the OAM system, an integrated reference point manager (IRPManager) and an integrated reference point agent (IRPAgent) are connected through a northbound interface Itf-N. The IRPManager is equivalent to a network manager and is responsible for the operation, maintenance, and management of a whole network; the IRPAgent is equivalent to a network element manager and is responsible for the operation, maintenance, and management of a type of devices (for example, base stations) in a network. In an embodiment of the present invention, the IRPManager configures an energy saving policy for the IRPAgent, where the energy saving policy is used to control the energy saving function management process of a specified base station in the range of the IRPAgent. In the specific implementation, the IRPAgent may transmit a received energy saving policy to the base station, for example, it transparently transmits the policy. Energy saving deactivation in the embodiment of the present invention may also be called energy saving recovery, that is, an energy saving entity (a base station or cell) terminates an energy saving state and recovers from the energy saving state to a non energy saving state.

Figure 2:
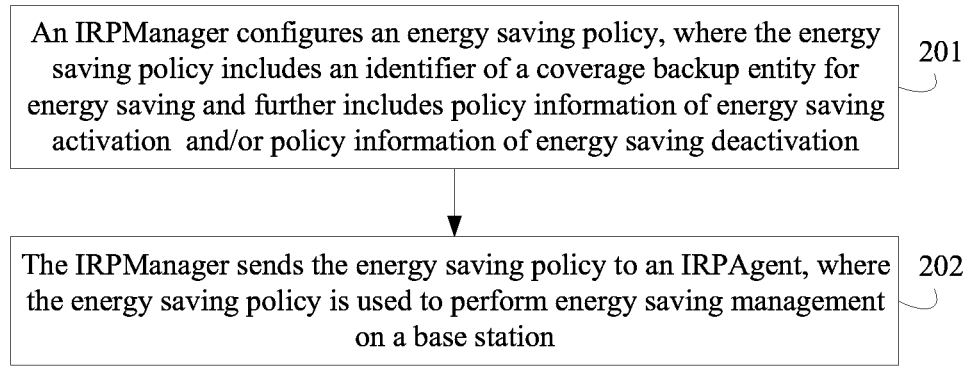
FIG. 2 is a schematic diagram of a method for energy saving management according to an embodiment of the present invention.

As shown in FIG. 2, a method for energy saving management according to an embodiment includes the following content.

201. An IRPManager configures an energy saving policy (ESPolicy), where the energy saving policy includes an identifier of a coverage backup entity for energy saving (esOverlaidBackupEntityID) and further includes policy information of energy saving activation and/or policy information of energy saving deactivation.

202. The IRPManager sends the energy saving policy to an IRPAgent, where the energy saving policy is used to perform energy saving management on a base station. In the specific implementation, the IRPAgent controls the energy saving function management process of a specified base station in the range of the IRPAgent after receiving the energy saving policy.

Specifically, the coverage identifier of the coverage backup entity for energy saving (esOverlaidBackupEntityID) is an identifier of an entity providing coverage backup for an energy saving entity (a base station or cell). When the energy saving entity is a base station, the coverage backup entity for energy saving is a base station providing coverage backup for the base station; when the energy saving entity is a cell, the coverage backup entity for energy saving is a cell providing coverage backup for the cell. Optionally, the identifier of the coverage backup entity for energy saving may also be a group identifier of multiple base stations or multiple cells providing coverage backup for the energy saving entity.

In the specific implementation, the IRPAgent parses the received group identifier to obtain identifiers of base stations or cells providing coverage backup for the energy saving entity. For example, coverage backup entities for energy saving are: cell A1, cell A2, and cell A3; the IRPManager may directly provide cell identifiers: A1, A2, and A3, or mark A as the group identifier of cell A1, cell A2, and cell A3 and provide A to the IRPAgent; then the IRPAgent parses the group identifier A to obtain the specific coverage backup cells A1, A2, and A3 for energy saving. Optionally, the identifier of the coverage backup entity for energy saving may further include: geographic area identifier, tracking area identifier, group identifier of multiple geographic areas, or group identifier of multiple tracking areas.

Optionally, the energy saving policy may further include information of energy saving target. An energy saving target is effect of reducing energy consumption, where the effect is reached after an energy saving entity (base station or cell) applies an energy saving process (energy saving activation or energy saving deactivation). The IRPManager configures, for the IRPAgent, an evaluation period (for example, calculated by week or month) of the energy saving target of the energy saving entity (base station or cell) and a percentage of energy consumption reduction (a relative value of the energy saving effect) or an absolute value of energy consumption reduction, so as to determine the energy saving effect reached by applying the energy saving process.

In the energy saving management method provided by this embodiment, the IRPManager configures an energy saving policy for the IRPAgent, and provides, to the IRPAgent, control method information needed for energy saving management on a base station, where the control method information includes an identifier of a coverage backup entity for energy saving and further includes policy information of energy saving activation and/or policy information of energy saving deactivation, so as to satisfy energy saving management requirements in different network deployment scenarios.

According to a non-restrictive specific embodiment, energy saving policies may be classified into centralized energy saving policies and hybrid energy saving policies.

Table 1 shows attributes and related content of an energy saving policy, for example, a centralized energy saving policy, where the centralized energy saving policy may be used for energy saving management in a centralized management architecture, that is, the energy saving operation of a base station is triggered by an operation, administration and maintenance system. In a centralized energy saving architecture, an energy saving operation may be performed at a cell level or base station level. Therefore, the energy saving entity in this embodiment is an energy saving cell or an energy saving base station. The energy saving policy includes an identifier of a coverage backup entity for energy saving and further includes policy information of energy saving activation and/or policy information of energy saving deactivation, where the policy information of energy saving activation includes operation type of energy saving and delay of energy saving activation and further includes time of energy saving activation and enabler information of energy saving activation. The policy information of energy saving deactivation includes: enabler information of energy saving deactivation and/or time of energy saving deactivation; the policy information of energy saving deactivation further includes delay of energy saving deactivation in case of OAM link break and/or retry count of OAM connection reestablishment before energy saving deactivation in case of OAM link break.

TABLE 1

| Attribute Name | Definition | Value |
|---|---|---|
| Identifier of a coverage backup entity for energy saving (esOverlaidBackupEntityID) | Identifier of an entity (base station or cell) providing coverage backup for an energy saving entity (base station or cell) | List of object entity identifiers, referring to the definition of the id in 3GPP TS 32.762 |
| Enabler information of energy saving activation (esActivationEnabler) | Whether to perform an energy saving activation operation on a northbound interface | Boolean {yes, no} |
| Time of energy saving activation (esActivationTime) | Indicating time of executing an energy saving activation operation by a base station | May be a specific time point (time point) |
| Operation type of energy saving(esOperationType) | Type of the energy saving operation executed by the base station | Enumeration {base station on/off, cell on/off, . . .} |
| Delay of energy saving activation (esActivationDelay) | Waiting time in which the IRPAgent waits for the base station to asynchronously respond to an energy saving activation command (in seconds) | Unsigned integer (Unsigned Int) |
| Delay of energy saving deactivation in case of OAM link break (esOAMLossDeactivationDelay) | Waiting time before energy saving algorithm of the base station performs an energy saving deactivation operation when the base station detects an OAM link failure (in seconds) | Unsigned integer (Unsigned Int) |
| Retry count of OAM connection reestablishment before energy saving deactivation in case of OAM link break (esOAMConnectionRetries) | Retry count of OAM connection reestablishment before energy saving algorithm of the base station performs energy saving deactivation when the base station detects an OAM link failure | Unsigned integer (Unsigned Int) |
| Enabler information of energy saving deactivation (esDeactivationEnabler) | Whether to perform an energy saving deactivation operation on the northbound interface | Boolean {yes, no} |
| Time of energy saving deactivation (esDeactivationTime) | Used for indicating time of executing energy saving deactivation | May be a specific time point (time point) |

In Table 1, the energy saving operation type, enabler information of energy saving activation, delay of energy saving activation, and time of energy saving activation are all policy information related to energy saving activation (esActivation), and may be collectively called policy information of energy saving activation; the enabler information of energy saving deactivation, time of energy saving deactivation, delay of energy saving deactivation in case of OAM link break, and retry count of OAM connection reestablishment before energy saving deactivation in case of OAM link break are all policy information related to energy saving deactivation (esDeactivation), and may be collectively called policy information of energy saving deactivation.

The following specifically describes the related content of the centralized energy saving policy that the IRPManager configures as shown in Table 1.

(1) Identifier of a coverage backup entity for energy saving (esOverlaidBackupEntityID). The IRPManager sends, to the IRPAgent, an identifier of a neighboring base station or cell providing basic coverage backup for the energy saving base station or cell, so that the base station managed by the IRPAgent hands over an active user in the energy saving base station or cell to the coverage backup base station or cell before executing an energy saving activation operation.

(2) Operation type of energy saving (esOperationType). The IRPManager configures the operation type of energy saving of the base station, and transmits the type of the specific energy saving operation executed by the base station in the energy saving activation operation to the IRPAgent. On a network management northbound interface Itf-N, the operation type of energy saving configured by the IRPManager includes: base station on/off, or cell on/off. The value of the policy attribute is extensible, for example, the operation type may also be configured to voltage dynamic regulation of a cell power amplifier.

(3) Delay of energy saving activation (esActivationDelay). When the condition for triggering energy saving activation is satisfied, the IRPManager configures the delay of energy saving activation for the IRPAgent, namely, the delay existing when the IRPAgent waits for the base station to asynchronously respond in the energy saving activation process. After the IRPAgent sends the delay of energy saving activation configured by the IRPManager to the base station, the active user in the energy saving base station or cell (namely, the base station or cell that will go into an energy saving state) will be transferred within the delay time, to the base station or cell providing coverage backup, and then the base station executes an energy saving operation, that is, a response to energy saving activation is made asynchronously. The purpose of the policy attribute is to prevent the energy saving operation from causing strong jitter impact on network performance and quality of service and avoid ping-pong energy saving effect. If the delay of energy saving activation ends (for example, a timer expires), and the active user in the energy saving base station or cell is still not handed over to the base station or cell providing coverage backup, that is, the IRPManager does not receive the operation response of the IRPAgent within the specified asynchronous response waiting delay, the IRPManager considers that the execution of the energy saving activation operation fails. If the esActivationDelay policy attribute is configured to 0, it indicates that the energy saving activation operation needs to be executed immediately, that is, the active user in the energy saving base station or cell does not need to be handed over.

(4) Delay of energy saving deactivation in case of OAM link break (esOAMLossDeactivationDelay). The IRPManager configures the energy saving deactivation waiting delay in case of OAM link break. The IRPManager configures one energy saving deactivation waiting delay of a base station for the IRPAgent (for example, configures a timer), and the IRPAgent transmits the delay to the base station transparently. When an OAM link failure occurs, the link between the base station and an OAM system breaks and communication cannot be performed. The base station waits until the waiting delay ends (for example, the timer expires), and then starts an energy saving deactivation process in an exceptional case, so that an invalid energy saving deactivation operation caused by an intermittent alarm due to the OAM link break can be avoided. If the value of the policy attribute is 0, it indicates that the energy saving deactivation operation is executed immediately.

(5) Retry count of OAM connection reestablishment before energy saving deactivation in case of OAM link break (esOAMConnectionRetries). The IRPManager configures the retry count of OAM connection reestablishment before energy saving deactivation in case of OAM link break. Specifically, the IRPManager configures, for the IRPAgent, the retry count of OAM connection reestablishment by a base station, and the IRPAgent transparently transmits the retry count to the base station executing the energy saving operation. When an OAM link failure occurs, the link between the base station and an OAM system breaks and communication cannot be performed. Before energy saving deactivation, the base station may execute the process of reestablishing an OAM link, and after the retry count is reached, if reestablishing the OAM link by the base station still fails, the base station directly executes the energy saving deactivation process.

(6) Enabler information of energy saving activation (esActivationEnabler). The IRPManager configures the policy attribute for the IRPAgent, indicating whether an energy saving activation function (Energy Saving Activation function) on a northbound interface Itf-N is enabled (enabled). The value of the policy attribute may be configured to a Boolean type {yes, no}.

(7) Enabler information of energy saving deactivation (esDeactivationEnabler). The IRPManager configures the policy attribute for the IRPAgent, indicating whether an energy saving deactivation function (Energy Saving Deactivation function) on a northbound interface Itf-N is enabled (enabled). The value of the policy attribute may be configured to a Boolean type {yes, no}.

(8) Time of energy saving deactivation (esDeactivationTime). The IRPManager configures the policy attribute for the IRPAgent, indicating the time of executing energy saving deactivation. The value of the policy attribute may be a specific time point.

(9) Time of energy saving activation (esActivationTime). The IRPManager configures the policy attribute for the IRPAgent, indicating the time of executing energy saving activation. The value of the policy attribute may be a specific time point.

Table 2 shows attributes and related content of another energy saving policy, for example, a hybrid energy saving policy (HybridESPolicies), where the hybrid energy saving policy may be used for energy saving management in a hybrid management architecture, that is, the energy saving operation of a base station may be triggered not only by the base station itself but also by an OAM system, but the triggering condition of the base station is decided by triggering condition information exchanged between the OAM system and the base station. In a hybrid energy saving architecture, the energy saving operation is at a cell level. Therefore, an energy saving entity in this embodiment is an energy saving cell. The energy saving policy includes: an identifier of a coverage backup entity for energy saving and further includes policy information of energy saving activation and/or policy information of energy saving deactivation, where the policy information of energy saving activation includes load threshold for energy saving activation or includes load threshold for energy saving activation and operation type of energy saving (for the specific content of this policy attribute, reference may be made to the content in Table 1). The policy information of energy saving deactivation includes one or more pieces of the following information: load threshold for energy saving deactivation, delay of energy saving deactivation in case of X2 link break, and retry count of X2 connection reestablishment before energy saving deactivation in case of X2 interface link break.

TABLE 2

| Attribute Name | Definition | Value |
| --- | --- | --- |
| Identifier of a coverage backup entity for energy saving (esOverlaidBackupEntityID) | Identifier of an entity (cell) providing coverage backup for an energy saving entity (cell) | List of object entity identifiers, referring to the definition of the id in 3GPP TS 32.762 |
| Local load threshold for energy saving activation (esActivationLocalLoadThreshold) | Local entity (cell)'s load threshold for triggering an energy saving activation process | Usage of physical resource blocks (referring to 3GPP TS36.314) |
| Backup load threshold for energy saving activation (esActivationBackupLoadThreshold) | Coverage backup entity (cell)'s load threshold for triggering an energy saving activation process | Usage of physical resource blocks (referring to 3GPP TS36.314) |
| Backup load threshold for energy saving deactivation (esDeactivationBackupLoadThreshold) | Coverage backup entity (cell)'s load threshold for triggering an energy saving deactivation process | Usage of physical resource blocks (referring to 3GPP TS36.314) |
| Delay of energy saving deactivation in | Waiting time before an energy | Unsigned integer |

TABLE 2-continued

| Attribute Name | Definition | Value |
| --- | --- | --- |
| case of X2 link break (esX2LossDeactivationDelay) | saving algorithm of the base station performs an energy saving deactivation operation when the base station detects an X2 link failure (in seconds) | (Unsigned Int) |
| Retry count of X2 connection reestablishment before energy saving deactivation in case of X2 link break (esX2ConnectionRetry count) | Retry count of X2 connection reestablishment before an energy saving algorithm of the base station performs energy saving deactivation when the base station detects an X2 link break failure | Unsigned integer (Unsigned Int) |

In Table 2, the load threshold for energy saving activation (including the local load threshold for energy saving activation and the backup load threshold for energy saving activation) is policy information related to energy saving activation (esActivation), and may also be called policy information of energy saving activation; the load threshold for energy saving deactivation (for example, the backup load threshold for energy saving deactivation), delay of energy saving deactivation in case of X2 link break, and retry count of X2 connection reestablishment before energy saving deactivation in case of X2 link break are all policy information related to energy saving deactivation (esDeactivation), and may also be collectively called policy information of energy saving deactivation.

The following specifically describes the related content of the hybrid energy saving policy (HybridESPolicies) that the IRPManager configures as shown in Table 2.

(1) Identifier of a coverage backup entity for energy saving (esOverlaidBackupEntityID). The IRPManager sends the identifier of a neighboring cell providing basic coverage backup for an energy saving cell to the IRPAgent, so that a base station (namely, a base station that the energy saving cell belongs to) managed by the IRPAgent hands over an active user in the energy saving cell to the coverage backup cell before executing an energy saving activation operation.

(2) The IRPManager configures a load threshold policy attribute, that is, configures a load threshold used for triggering energy saving activation (namely, a load threshold for energy saving activation) and a load threshold used for triggering energy saving deactivation (namely, a load threshold for energy saving deactivation).

Specifically, the load threshold for energy saving activation includes: the local load threshold for energy saving activation (esActivationLocalLoadThreshold) and the backup load threshold for energy saving activation (esActivationBackupLoadThreshold). The local load threshold for energy saving activation (esActivationLocalLoadThreshold) is a load threshold of a local entity for triggering energy saving activation, and the backup load threshold for energy saving activation (esActivationBackupLoadThreshold) is a coverage backup entity (cell)'s load threshold for triggering energy saving activation. The load threshold for energy saving deactivation includes a backup load threshold for energy saving deactivation (esDeactivationBackupLoadThreshold), where the backup load threshold for energy saving deactivation is a coverage backup entity's load threshold for triggering energy saving deactivation.

After the IRPAgent transfers the load threshold policy attribute to the base station that the energy saving cell belongs to, the base station makes an energy saving activation decision according to its own energy saving algorithm by using the local load threshold for energy saving activation (esActivationLocalLoadThreshold) and the backup load threshold for energy saving activation (esActivationBackupLoadThreshold) in an energy saving activation process. For example, if the base station determines that the local load of the energy saving cell is lower than the local load threshold and the load of a coverage backup cell for energy saving is also lower than the backup load threshold for energy saving coverage, that is, the base station may hand over the load of the energy saving cell to the coverage backup cell for energy saving to perform energy saving activation. In an energy saving deactivation process, the backup load threshold for energy saving deactivation (esDeactivationBackupLoadThreshold) is used to make an energy saving deactivation decision. In addition, according to the local load threshold for energy saving activation configured by the IRPManager, the IRPAgent may monitor the local load of the energy saving cell in real time and calculate the low-load period (Low-Load Period) of the energy saving cell, and report it to the IRPManager periodically. The IRPManager may configure the energy saving effective period of the energy saving cell according to the low-load period of the energy saving entity cell, that is, in which period an energy saving base station is allowed to perform an energy saving operation on the energy saving cell.

(3) Delay of energy saving deactivation in case of X2 link break (esX2LossDeactivationDelay). The IRPManager configures energy saving deactivation waiting delay in case of X2 link break. Specifically, the IRPManager configures the delay of energy saving deactivation in case of X2 link break (for example, configures a timer) for the IRPAgent, and the IRPAgent transparently transmits the delay to a base station executing energy saving (namely, a base station that the energy saving cell belongs to). When an X2 link failure occurs, a base station originally connected with an X2 interface cannot communicate. A base station receiving an energy saving policy waits until the delay ends (for example, the timer expires), and then the base station starts an energy saving deactivation process in an exceptional case, so that an invalid energy saving deactivation operation caused by an intermittent alarm due to the link break of any X2 link can be avoided. When the value of the policy attribute is 0, it indicates immediate execution.

(4) Retry count of X2 connection reestablishment before energy saving deactivation in case of X2 link break (esX2ConnectionRetries). The IRPManager configures the retry count of X2 connection reestablishment before energy saving deactivation in case of an X2 link failure. Specifically, the IRPManager configures the retry count of X2 connection reestablishment for the IRPAgent, and the IRPAgent transparently transmits the retry count to the base station executing the energy saving operation. When an X2 link failure occurs, the base station and a base station that is originally connected to the X2 interface are disconnected and communication cannot be implemented. In this case, before energy saving deactivation, the base station may execute an X2 link reestablishment process. If X2 link reestablishment does not succeed yet after the retry count is reached, the base station executing energy saving executes an energy saving deactivation process directly.

The content of the energy saving policy is described in detail above. The following describes in detail the specific method for the IRPManager to configure the above energy saving policy.

According to an embodiment, the energy saving policy is included in a dedicated subclass of energy saving policy of a network resource management object class. Specifically, the IRPManager may configure the energy saving policy to be in the dedicated subclass of energy saving policy of the network resource management object class. The specific implementation method may be adding a new subclass to an existing network resource management object class, where the new subclass is specially used for configuring the energy saving policy. For example, in the network resource model of the existing E-UTRAN, a new energy saving policy subclass (ESPolicies) is added to a base station function class (eNBFunction) and a generic cell class (EUtranGenericCell). The policy attributes in Table 1 or Table 2 are configured in the energy saving policy subclass.

According to another embodiment, the identifier of the coverage backup entity for energy saving in the energy saving policy is included in an attribute of the network resource management object class, and the policy information of energy saving activation and/or policy information of energy saving deactivation in the energy saving policy is included in a dedicated subclass of the network resource management object class. Specifically, the IRPManager may configure the identifier of the coverage backup entity for energy saving in the energy saving policy to be in the attribute of the network resource management object class, and configure the policy information of energy saving activation and/or policy information of energy saving deactivation in the energy saving policy to be in the dedicated subclass of the network resource management object class. The specific implementation method may be: directly configuring the identifier of the coverage backup entity for energy saving in Table 1 or Table 2 to be in the attribute of an existing base station function class (eNBFunction) and generic cell class (EUtranGenericCell), and configuring a new subclass in the existing base station function class (eNBFunction) and generic cell class (EUtranGenericCell), and configuring other policy attributes in Table 1 or Table 2 to be in the new configured subclass.

This embodiment provides an energy saving management method used in the centralized energy saving management architecture and an energy saving management method used in the hybrid energy saving management architecture, the IRPManager provides information needed for performing energy saving management on the base station to the IRPAgent by configuring a centralized energy saving policy or a hybrid energy saving policy for the IRPAgent, so as to satisfy energy saving management requirements in different network deployment scenarios. In addition, because the IRPAgent may transparently transmit the energy saving policy to the base station, valid input of energy saving algorithm of the base station is enhanced.

Energy saving management implemented by configuring the energy saving policy by the IRPManager is described above. The following describes energy saving management performed by the IRPManager by using explicit commands.

The energy saving management in the centralized management architecture may be implemented by sending an explicit energy saving activation command by the IRPManager to the IRPAgent.

The process of energy saving activation is shown in FIG. 3, and includes the following content.

301. The IRPManager sends an energy saving activation command to the IRPAgent, requiring the IRPAgent to initiate an energy saving activation process on one or more energy saving entities (base stations or cells), where the energy saving activation command includes an identifier of an energy saving entity and further includes one or more pieces of the following information: operation type of energy saving, delay of energy saving activation, delay of energy saving deactivation in case of OAM link break, and retry count of OAM connection reestablishment before energy saving deactivation in case of OAM link break. Specifically, the identifier of the energy saving entity includes: an identifier of an energy saving base station, or an identifier of an energy saving cell, or a group identifier of multiple energy saving base stations, or a group identifier of multiple energy saving cells. When the identifier of the energy saving entity is a group identifier of multiple energy saving base stations or a group identifier of multiple energy saving cells, the IRPAgent parses the group identifier of multiple energy saving base stations to obtain identifiers of the energy saving base stations, or parses the group identifier of multiple energy saving cells to obtain identifiers of the multiple energy saving cells. Optionally, the identifier of the coverage backup entity for energy saving may further include: geographic area identifier, tracking area identifier, group identifier of multiple geographic areas, or group identifier of multiple tracking areas.

Table 3 shows the specific content of the energy saving activation command activateES.

Configuring delay of energy saving activation in the energy saving activation command may prevent an energy saving operation from causing strong jitter impact to network performance and quality of service and avoid ping-pong energy saving effect. Configuring delay of energy saving deactivation in case of OAM link break in the energy saving activation command can avoid an invalid energy saving deactivation operation caused by an intermittent alarm due to the OAM link break.

TABLE 3

| Parameter Name | Information Type | Remark |
| --- | --- | --- |
| Operation type of energy saving(operationType) | Enumeration {base station on/off, cell on/off, . . .} | Indicating the type of the energy saving operation executed by the base station |

TABLE 3-continued

| Parameter Name | Information Type | Remark |
| --- | --- | --- |
| Identifier of an energy saving entity(esEntityId) | List of entity identifiers, referring to the definition of the id in 3GPP TS 32.762 | Identifier of the energy saving base station or energy saving cell |
| Activation delay (activationDelay) | Unsigned integer (Unsigned Int) | Waiting time in which the IRPAgent waits for the base station to asynchronously respond to the energy saving activation command (in seconds) |
| Delay of energy saving deactivation in case of OAM link break (OAMLossDeactivationDelay) | Unsigned integer (Unsigned Int) | Waiting time before an energy saving algorithm of the base station performs an energy saving deactivation operation when the base station detects an OAM link failure (in seconds) |
| Retry count of OAM connection reestablishment before energy saving deactivation in case of OAM link break (esOAMConnectionRetries) | Unsigned integer (Unsigned Int) | Retry count of OAM connection reestablishment before the energy saving algorithm of the base station performs energy saving deactivation when the base station detects an OAM link failure |

TABLE 4

| Parameter Name | Information Type | Remark |
| --- | --- | --- |
| Identifier of an energy saving entity(esEntityId) | List of object entity identifiers, referring to the definition of the id in 3GPP TS 32.762 | Identifier of the base station or cell object entity executing energy saving activation |
| Result (result) | Enumeration {success, failure} | Indicating the execution result of energy saving activation: "success" indicates that the IRPAgent accepts the energy saving activation request of the IRPManager; "failure" indicates that the IRPAgent fails to initiate the energy saving activation operation. |

302. The IRPManager receives an energy saving activation result sent by the IRPAgent. The energy saving activation result includes the identifier of the energy saving entity and the execution result of energy saving activation. The specific content is shown in Table 4.

With the application provided by this embodiment, the IRPManager sends an energy saving activation command to the IRPAgent and carries energy saving policy information in a command parameter, to implement energy saving management in the centralized architecture, which makes the energy saving management process more direct and simpler.

As shown in FIG. 4, an embodiment of the present invention provides an energy saving management system, where the energy saving management system 40 includes an integrated reference point manager IRPManager 400 and an integrated reference point agent IRPAgent 500. In a specific implementation process, the energy saving management system may be an operation, administration and maintenance system (for example, an OAM system).

Figure 5:
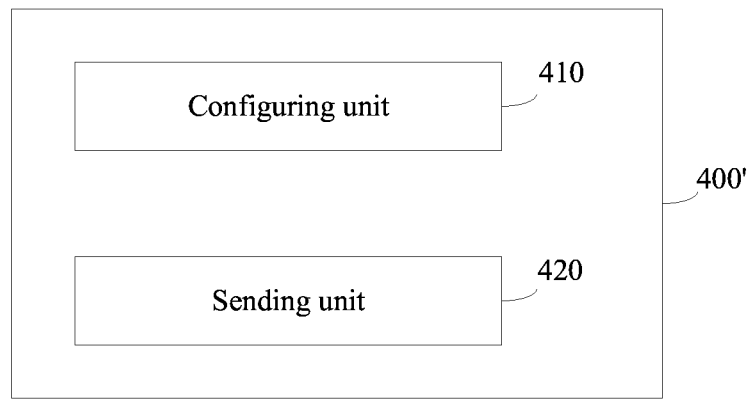
FIG. 5 is a schematic structural diagram of an integrated reference point manager according to an embodiment of the present invention.

According to an embodiment, as shown in FIG. 5, the IRPManager 400 may be specifically an IRPManager 400', including a configuring unit 410 and a sending unit 420.

Specifically, the configuring unit 410 cofigures an energy saving policy, where the energy saving policy includes an identifier of a coverage backup entity for energy saving and further includes policy information of energy saving activation and/or policy information of energy saving deactivation; and the sending unit 420 sends the energy saving policy to an integrated reference point agent IRPAgent 500, where the energy saving policy is used to perform energy saving management on a base station.

In the energy saving policy, the identifier of the coverage backup entity for energy saving includes: an identifier of an entity providing coverage backup for an energy saving entity, or a group identifier of multiple base stations or multiple cells providing coverage backup for an energy saving entity. For example, a coverage backup entity for energy saving is base station B1 and base station B2; the IRPManager 400 (or IRPManager 400') may directly provide base station identifiers B1 and B2, or mark B as the group identifier of base station B1 and base station B2 and provide the group identifier B to the IRPAgent 500; then the IRPAgent 500 parses the group identifier B to obtain the specific coverage backup base stations B1 and B2 for energy saving according to the group identifier B. When an identifier of an energy saving entity is a group identifier of multiple energy saving base stations or a group identifier of multiple energy saving cells, the IRPAgent 500 parses the group identifier of multiple energy saving base stations to obtain identifiers of the energy saving base stations, or parses the group identifier of multiple energy saving cells to obtain identifiers of the multiple energy saving cells.

Specifically, the policy information of energy saving activation includes operation type of energy saving and delay of energy saving activation, and further includes time of energy saving activation and enabler information of energy saving activation. The policy information of energy saving deactivation includes: enabler information of energy saving deactivation and/or time of energy saving deactivation, and optionally, may further include delay of energy saving deactivation in case of OAM link break and/or retry count of OAM connection reestablishment before energy saving deactivation in case of OAM link break. For the content of the specific policy attribute, reference may be made to Table 1.

According to another embodiment, the policy information of energy saving activation includes a load threshold for energy saving activation. Optionally, the policy information of energy saving activation may further include energy saving operation type. The policy information of energy saving deactivation includes one or more pieces of the following information: a load threshold for energy saving deactivation, delay of energy saving deactivation in case of X2 link break, and retry count of X2 connection reestablishment before energy saving deactivation in case of X2 link break. The load threshold for energy saving activation includes a local load threshold for energy saving activation and a backup load threshold for energy saving activation, where the local load threshold for energy saving activation is a load threshold of a local entity for triggering energy saving activation, and the backup load threshold for energy saving activation is a coverage backup entity's load threshold for triggering energy saving activation; the load threshold for energy saving deactivation includes a backup load threshold for energy saving deactivation, where the backup load threshold for energy saving deactivation is a coverage backup entity's load threshold for triggering energy saving deactivation. For the content of the specific policy attribute, reference may be made to Table 2.

Optionally, the configuring unit 410 is further configured to configure information of energy saving target in the energy saving policy.

In a specific implementation, the energy saving policy may be included in a dedicated subclass of energy saving policy of a network resource management object class, for example, the configuring unit 410 may configure the energy saving policy to be in the dedicated subclass of energy saving policy of the network resource management object class. Alternatively, the identifier of the coverage backup entity for energy saving in the energy saving policy is included in an attribute of the network resource management object class, and the policy information of energy saving activation and/or policy information of energy saving deactivation in the energy saving policy is included in a dedicated subclass of the network resource management object class. For example, the configuring unit 410 configures the coverage identifier of the coverage backup entity for energy saving in the energy saving policy to be in the attribute of the network resource management object class, and configures the policy information of energy saving activation and/or policy information of energy saving deactivation in the energy saving policy to be in the dedicated subclass of the network resource management object class.

Figure 6:
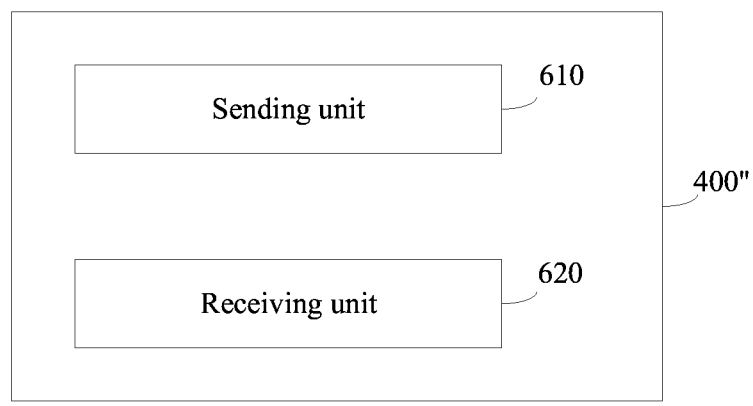
FIG. 6 is a schematic structural diagram of an integrated reference point manager according to another embodiment of the present invention.

According to another embodiment, as shown in FIG. 6, the IRPManager 400 may be specifically an IRPManager 400", including a sending unit 610 and a receiving unit 620.

In centralized energy saving management, the sending unit 610 sends an energy saving activation command to an IRPAgent 500, requiring the IRPAgent 500 to initiate an energy saving activation process on one or more energy saving entities, where the energy saving activation command includes an identifier of an energy saving entity and further includes one or more pieces of the following information: energy saving operation type, delay of energy saving activation, delay of energy saving deactivation in case of OAM link break, and retry count of OAM connection reestablishment before energy saving deactivation in case of OAM link break; and the receiving unit 620 receives an energy saving activation result sent by the IRPAgent 500. For the content of the specific policy attribute, reference may be made to Table 3.

The identifier of the energy saving entity includes: an identifier of an energy saving base station, or an identifier of an energy saving cell, or a group identifier of multiple energy saving base stations, or a group identifier of multiple energy saving cells. When the identifier of the energy saving entity is a group identifier of multiple energy saving base stations or a group identifier of multiple energy saving cells, the IRPAgent 500 parses the group identifier of multiple energy saving base stations to obtain identifiers of the energy saving base stations, or parses the group identifier of multiple energy saving cells to obtain identifiers of the multiple energy saving cells.

Persons of ordinary skill in the art should understand that all or part of the steps of the method specified in any embodiment of the present invention may be implemented by a program instructing relevant hardware. The program may be stored in a computer readable storage medium. When the program runs, the program executes the steps of the method specified in any embodiment above. The storage medium may be any medium capable of storing program codes, such as ROM, RAM, magnetic disk, or CD-ROM, etc.

It should be noted that the above embodiments are merely provided for describing the technical solutions of the present invention, but not intended to limit understanding of the present invention. Although the present invention is described in detail with reference to the exemplary embodiments, persons of ordinary skill in the art should understand that, modifications or equivalent replacements can be made to the technical solutions of the present invention without departing from the scope of the technical solutions of the present invention.

What is claimed is:

1. A method for energy saving management in a network management system, the network management system comprising an integrated reference point manager (IRPManager) and an integrated reference point agent (IRPAgent) connected to the IRPManager, the method comprising:

receiving, by the IRPAgent from the IRPManager, an identifier of a coverage backup entity and a load threshold for energy saving activation; and performing, by the IRPAgent, energy saving management on a local entity according to the identifier of the coverage backup entity and the load threshold for energy saving activation, wherein in performing the energy saving management, the coverage backup entity provides coverage backup for the local entity when the local entity enters an energy saving state; and wherein the load threshold for energy saving activation comprises a local load threshold for energy saving activation and a backup load threshold for energy saving activation, the local load threshold for energy saving activation is a load threshold of the local entity for triggering the local entity to enter the energy saving state, and the backup load threshold for energy saving activation is a load threshold of the coverage backup entity for triggering the local entity to enter the energy saving state.

2. The method according to claim 1, further comprising:

receiving, by the IRPAgent from the IRPManager, a load threshold for energy saving deactivation, wherein the load threshold for energy saving deactivation is used for triggering the local entity to leave the energy saving state in performing the energy saving management, and the load threshold for energy saving deactivation comprises a load threshold of the coverage backup entity for triggering the local entity to leave the energy saving state.

3. The method according to claim 1, wherein the identifier of the coverage backup entity comprises:

an identifier of a cell or a base station providing coverage backup for the local entity, or a group identifier of multiple cells or multiple base stations providing coverage backup for the local entity; or a geographic area identifier, a tracking area identifier, a group identifier of multiple geographic areas, or a group identifier of multiple tracking areas.

4. The method according to claim 1, wherein the local entity is a base station or a cell.

5. The method according to claim 4, wherein the local entity is a base station and the coverage backup entity is a base station providing coverage backup for the local entity.

6. The method according to claim 4, wherein the local entity is a cell and the coverage backup entity is a cell providing coverage backup for the local entity.

7. An integrated reference point agent (IRPAgent), comprising:

a processor; and a non-transitory computer readable storage medium coupled to the processor, wherein the non-transitory computer readable storage medium comprises a program, and the program is executed by the processor to:

receive, from an integrated reference point manager (IRPManager), an identifier of a coverage backup entity and a load threshold for energy saving activation; and perform energy saving management on a local entity according to the identifier of the coverage backup entity and the load threshold for energy saving activation, wherein in performing the energy saving management, the coverage backup entity provides coverage backup for the local entity when the local entity enters an energy saving state, and the load threshold for energy saving activation comprises a local load threshold for energy saving activation and a backup load threshold for energy saving activation, the local load threshold for energy saving activation is a load threshold of the local entity for triggering the local entity to enter the energy saving state, and the backup load threshold for energy saving activation is a load threshold of the coverage backup entity for triggering the local entity to enter the energy saving state.

8. The IRPAgent according to claim 7, wherein the program is further executed by the processor to:

receive, from the IRPManager, a load threshold for energy saving deactivation, wherein the load threshold for energy saving deactivation is used for triggering the local entity to leave the energy saving state in performing the energy saving management, and the load threshold for energy saving deactivation comprises a load threshold of the coverage backup entity for triggering the local entity to leave the energy saving state.

9. The IRPAgent according to claim 7, wherein the identifier of the coverage backup entity comprises:

an identifier of a cell or a base station providing coverage backup for the local entity, or a group identifier of multiple cells or multiple base stations providing coverage backup for the local entity; or a geographic area identifier, a tracking area identifier, a group identifier of multiple geographic areas, or a group identifier of multiple tracking areas.

10. The IRPAgent according to claim 7, wherein the local entity is a base station or a cell.

11. The IRPAgent according to claim 10, wherein the local entity is a base station and the coverage backup entity is a base station providing coverage backup for the local entity.

12. The IRPAgent according to claim 10, wherein the local entity is a cell and the coverage backup entity is a cell providing coverage backup for the local entity.

13. A non-transitory computer-readable storage medium having stored thereon a computer program for energy saving management in a network management system, wherein when the computer program is executed by a processor the computer program instructs the processor to:

receive, from an integrated reference point manager (IRPManager), an identifier of a coverage backup entity and a load threshold for energy saving activation; and perform energy saving management on a local entity according to the identifier of the coverage backup entity and the load threshold for energy saving activation, wherein in performing the energy saving management, the coverage backup entity provides coverage backup for the local entity when the local entity enters an energy saving state, and the load threshold for energy saving activation is used for triggering the local entity to enter the energy saving state;

wherein the load threshold for energy saving activation comprises a local load threshold for energy saving activation and a backup load threshold for energy saving activation, the local load threshold for energy saving activation is a load threshold of the local entity for triggering the local entity to enter the energy saving state, and the backup load threshold for energy saving activation is a load threshold of the coverage backup entity for triggering the local entity to enter the energy saving state.

14. The non-transitory computer-readable storage medium according to claim 13, wherein when the computer program is executed by a processor the computer program further instructs the processor further to:

receive, from the IRPManager, a load threshold for energy saving deactivation, wherein the load threshold for energy saving deactivation is used for triggering the local entity to leave the energy saving state in performing the energy saving management, and the load threshold for energy saving deactivation comprises a load threshold of the coverage backup entity for triggering the local entity to leave the energy saving state.

15. An integrated reference point manager (IRPManager), comprising:

a processor; and a non-transitory computer readable storage medium coupled to the processor, wherein the non-transitory computer readable storage medium comprises a program, and the program is executed by the processor to:

configure an identifier of a coverage backup entity and a load threshold for energy saving activation;

send the identifier of the coverage backup entity and the load threshold for energy saving activation to an integrated reference point agent (IRPAgent) connected to the IRPManager, wherein the identifier of the coverage backup entity and the load threshold for energy saving activation are used to perform energy saving management on a local entity, wherein in performing the energy saving management, the coverage backup entity provides coverage backup for the local entity when the local entity enters an energy saving state, the load threshold for energy saving activation is used for triggering the local entity to enter the energy saving state;

wherein the load threshold for energy saving activation comprises a local load threshold for energy saving activation and a backup load threshold for energy saving activation, the local load threshold for energy saving activation is a load threshold of the local entity for triggering the local entity to enter the energy saving state, and the backup load threshold for energy saving activation is a load threshold of the coverage backup entity for triggering the local entity to enter the energy saving state.

16. The IRPManager according to claim 15, wherein the program is further executed by the processor to:

configure a load threshold for energy saving deactivation and send the load threshold for energy saving deactivation to the IRPAgent, wherein the load threshold for energy saving deactivation is used for triggering the local entity to leave the energy saving state in performing the energy saving management, and the load threshold for energy saving deactivation comprises a load threshold of the coverage backup entity for triggering the local entity to leave the energy saving state.

17. The IRPManager according to claim 15, wherein the identifier of the coverage backup entity comprises:

an identifier of a cell or a base station providing coverage backup for the local entity, or a group identifier of multiple cells or multiple base stations providing coverage backup for the local entity; or a geographic area identifier, a tracking area identifier, a group identifier of multiple geographic areas, or a group identifier of multiple tracking areas.

18. The IRPManager according to claim 15, wherein the local entity is a base station or a cell.

19. The IRPManager according to claim 18, wherein the local entity is a base station and the coverage backup entity is a base station providing coverage backup for the local entity.

20. The IRPManager according to claim 18, wherein the local entity is a cell and the coverage backup entity is a cell providing coverage backup for the local entity.

* * * * *